US009245238B2

(12) United States Patent
Mejia et al.

(10) Patent No.: US 9,245,238 B2
(45) Date of Patent: Jan. 26, 2016

(54) DYNAMIC GROUPING OF EMAIL RECIPIENTS (75) Inventors: Irgelkha Mejia, Austin, TX (US); Joseph Arcuri Anthony, Austin, TX (US); Sushma Bharat Patel, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1386 days.

(21) Appl. No.: 12/174,064

(22) Filed: Jul. 16, 2008

(65) Prior Publication Data
US 2010/0017478 A1 Jan. 21, 2010

(51) Int. Cl.
*G06F 15/16* (2006.01)
*G06Q 10/00* (2012.01)

(52) U.S. Cl.
CPC ........................... *G06Q 10/00* (2013.01)

(58) Field of Classification Search
CPC ...................................... G06Q 10/00
USPC ........................................... 709/206
See application file for complete search history.

(56) References Cited

U.S. PATENT DOCUMENTS

| 5,990,886 | A | 11/1999 | Serdy et al. |
| 7,103,634 | B1 | 9/2006 | Ullmann et al. |
| 7,197,300 | B2 | 3/2007 | Kushita |
| 7,320,019 | B2 * | 1/2008 | Malik ................. H04L 61/1564 709/206 |
| 2002/0111972 | A1 | 8/2002 | Lynch et al. |
| 2002/0165861 | A1 * | 11/2002 | Gilmour ........... G06F 17/30616 |
| 2003/0058478 | A1 | 3/2003 | Aoki |
| 2007/0189489 | A1 | 8/2007 | Carnazza et al. |
| 2007/0288575 | A1 * | 12/2007 | Gillum .................... H04L 51/28 709/206 |
| 2008/0140655 | A1 * | 6/2008 | Hoos et al. ........................ 707/6 |
| 2008/0235335 | A1 * | 9/2008 | Hintermeister ....... G06Q 10/107 709/206 |
| 2009/0049140 | A1 * | 2/2009 | Stoddard .............. G06Q 10/107 709/206 |
| 2009/0300546 | A1 * | 12/2009 | Kwok .................. G06Q 10/107 715/825 |
| 2010/0011064 | A1 * | 1/2010 | Mabry ................. G06Q 10/107 709/206 |
| 2010/0017194 | A1 * | 1/2010 | Hammer .............. G06Q 10/107 704/9 |

OTHER PUBLICATIONS

Smale et al; Broadcasting Information via Display Names in Instant Messaging, Group'05, Nov. 6-9, 2005, 89-98, ACM, 1-59593-223-2/05/0011, Sanibel Island, Florida, USA.

Hershkop et al; Combining Email models for False Positive Reduction, KDD'05, Aug. 21-24, 2005, 98-107, ACM 1-59593-135-X/05/0008, Chicago, Illinois, USA.

(Continued)

*Primary Examiner* — Arvin Eskandarnia
(74) *Attorney, Agent, or Firm* — Garg Law Firm, PLLC; Rakesh Garg; Joseph Petrokaitis (57) ABSTRACT

A method, system, and computer usable program product for dynamic grouping of email recipients are provided in the illustrative embodiments. A first recipient and a second recipient of a first email are identified and an association is formed between them. A selection of the first recipient is detected in a second email. Using the association, the second recipient is suggested as a recipient of the second email. The first email may be a previously sent email, and the second email may be an email being composed. A characteristic of the first email is identified and the characteristic may be used as a basis for the association in forming the association. The characteristic may be a phrase in, a type of content in, an attachment in, or a periodicity of the first email. Strength of the association may be modified based on the third email.

21 Claims, 6 Drawing Sheets (56) References Cited

OTHER PUBLICATIONS

Whittaker et al; Email in Personal Information Management, Communication of the ACM, Jan. 2006, 68-73, vol. 49, No. 1.

Wyman Miles, A High-Availability High-Performance Email Cluster, SIGUCCS'02, Nov. 20-23, 2002, 84-88, ACM 1-58113-564-5/02/0011, Providence, Rhode Island, USA.

* cited by examiner

| NAME 502 | ASSOCIATIONS 504 |
|---|---|
| NAME 1 | NAME 2, NAME 3, NAME 4 |
| NAME 2 | NAME 1, NAME 4, NAME 6, NAME 7 |
| NAME 3 | NAME 1, NAME 6, GROUP 1 |
| NAME 4 | NAME 1, GROUP 2 |
| NAME 5 | |

DYNAMIC GROUPING OF EMAIL RECIPIENTS

BACKGROUND OF THE INVENTION

1. Field of the Invention

The present invention relates generally to an improved data processing system, and in particular, to a computer implemented method for email communication. Still more particularly, the present invention relates to a computer implemented method, system, and computer usable program code for dynamic grouping of email recipients.

2. Description of the Related Art

An increasing number of users use email systems for communicating with other users. Often, a user may send an email to one or more recipients. Presently, a user may create groups of recipients or may reuse pre-created recipient groups to send an email message to the member recipients included of those groups.

Frequently, the recipients and recipient groups with whom the user may exchange emails may reach unmanageable numbers. To manage the recipients and pre-defined recipient groups, various software applications, such as email address book, contacts lists, databases, and directories are available to a user. However, the user has to invest time and effort, sometimes repetitive effort, to manage the recipients' and recipient groups' information in such applications.

Some applications provide a predictive display of email addresses that match a partial email address as the user begins to type a recipient's email address. Still, the user must recall at least a name of the recipient if not the email address, and begin typing the name or the email address in order to use such predictive features.

On the other hand, predefined recipient groups assume that a user will always want to send an email to each member of the group when the user selects the group. Should the user desire to send the email to only some members of the group, the user has to expand the group to reveal individual address, of which there can be many. Then the user has to selectively eliminate the addresses the user does not wish to use for the email.

A common email user knows that editing a predefined group as needed for each email can be cumbersome, prone to errors, and vastly repetitive when the user sends several emails. A common email user also knows that including recipients in an email one recipient at a time can also be time consuming and sometimes frustrating.

Some applications may form grouping of recipients by some commonly defined criterion. For example, an application may group those users in a group who are in geographical proximity of one another. However, such grouping is also largely predefined and the criteria for grouping predefined.

Most email applications also allow a "Reply All" feature whereby the user may respond to all recipients of an original email. However, such features still require the user to select, add, or eliminate recipients manually if the user desires not to reply to all recipients of the original email. Therefore, a system, computer implemented method, and computer usable program product for dynamic grouping of email recipients will be beneficial.

SUMMARY OF THE INVENTION

The illustrative embodiments provide a method, system, and computer usable program product for dynamic grouping of email recipients. A first recipient and a second recipient of a first email are identified. An association is formed between the first recipient and the second recipient. A selection of the first recipient is detected in a second email. Using the association, the second recipient is suggested as a recipient of the second email.

The first email may be a previously sent email, and the second email may be an email being composed. A characteristic of the first email is identified and the characteristic may be used as a basis for the association in forming the association. The characteristic may be a phrase in, a type of content in, an attachment in, or a periodicity of the first email.

The association may be stored. An indicator of strength of the association may be assigned to the association. The strength of the association may correspond to the likelihood that the second recipient should receive an email being sent to the first recipient. A third email directed to the first recipient and the second recipient may be detected. The strength of the association may be modified based on the third email.

The suggesting may include suggesting a list of several associated recipients. The list may be displayed. A first input indicating a selection of a third recipient from the list may be accepted. The third recipient may be included as a recipient of the second email. The list may further include a set of preformed groups of recipients. The selection of the third recipient may be a selection of a preformed group from the set of preformed groups.

Alternatively, a second input may be accepted to arrange the list according to a user preference. A third input may be accepted to form a group. The group may include some combination of some of the associated recipients from the several associated recipients and a subset of a set of preformed groups included in the list.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments described herein provide a method, system, and computer usable program product for dynamic grouping of email recipients. The illustrative embodiments are sometimes described herein using particular technologies only as an example for the clarity of the description. The illustrative embodiments may be used for dynamically grouping email recipients in the manner described in a variety of email applications in a variety of data processing systems.

The illustrative embodiments recognize that presently available email applications are restrictive in how the recipients may be selected and grouped. Furthermore, presently available applications require creating groups of recipients ahead of sending an email. These solutions further create recipient groups that are based on fixed common criteria shared by those recipients.

The illustrative embodiments further recognize that when a user inputs one recipient's name or email address in an outgoing email message, the user frequently can contemplate other recipients to whom the user might wish to send the same email. However, as the illustrative embodiments recognize, present email applications limit the user to either entering each recipient's information manually, or selecting from preformed groups, or editing a preformed group, for each email the user sends.

The user, having invested the labor in entering, adding, deleting, or modifying recipients and groups in a particular email, may decide to save the collection of recipients as a new group. However, the illustrative embodiments further recognize that even if the user saves and creates such a group, the user may not be able to avoid the same laborious exercise yet again when the user wishes to send another email to a different group of persons.

To address these and other problems related to sending emails to groups of recipients, the illustrative embodiments provide a method, system, and computer usable program product for dynamically grouping email recipients.

The illustrative embodiments provide ways by which a user's previously sent emails are data-mined to discover relationships and associations among various recipients. Data mining is a way of analyzing data for uncovering or discovering patterns and relationships among various pieces of data.

The illustrative embodiments may associate one recipient with one or more other recipients based on the information discovered from the user's previous emails. As the user sends and receives more email messages, the data mining is refined and re-executed to modify the discovered associations and create new ones. The illustrative embodiments may associate recipients with one another dynamically, to wit, based on the user's current and previous inputs.

As an example, in one operation, the user may begin to input an email message and identify a recipient. An email application enhanced with some of the illustrative embodiments may present a selection of recipients who are associated with the already identified recipient, and to whom the user may wish to send the same email.

The illustrative embodiments may form the associations using a variety of pieces of information from the current and/or previous emails the user may have created. For example, the illustrative embodiments may use not only any previous grouping of recipients evident in the distribution of previous emails, but also any common subject matter, keywords, themes, codes, phrases, or other contents in those emails that may associate particular recipients with certain other recipients.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
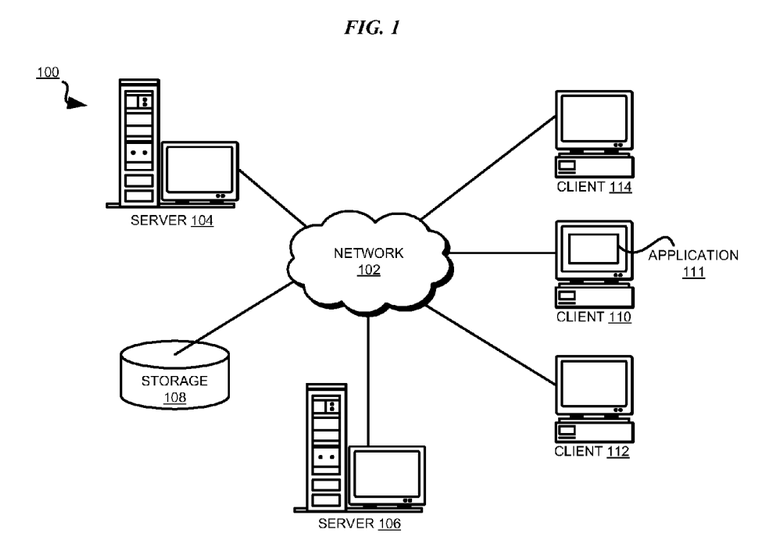
FIG. 1 depicts a pictorial representation of a network of data processing systems in which illustrative embodiments may be implemented.
Figure 2:
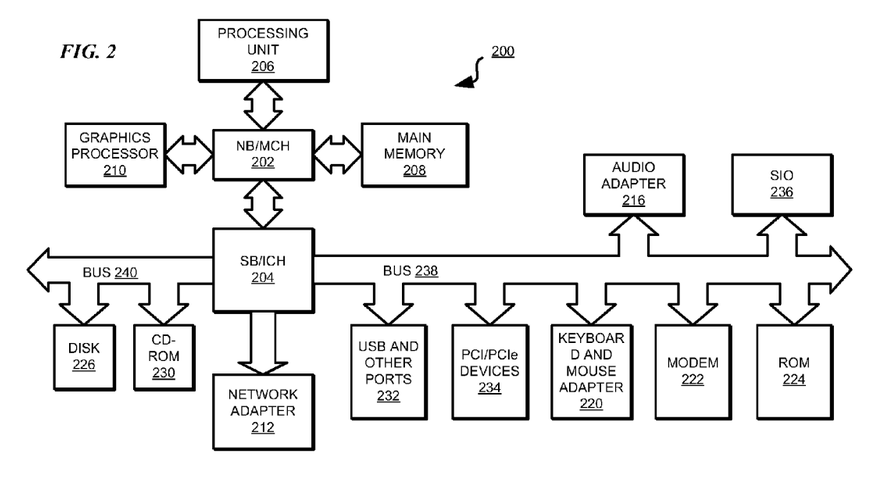
FIG. 2, this figure depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108 that may include a storage medium.

Software applications may execute on any computer in data processing environment 100. In the depicted example, server 104 includes application 105, which may be an example of a software application, in conjunction with which the illustrative embodiments may be implemented. In addition, clients 112, and 114 couple to network 102. Client 110 may include application 111, which may be an email application in context of which the illustrative embodiments may be deployed.

Router 120 may connect with network 102. Router 120 may use interfaces 122 and 124 to connect to other data processing systems. For example, interface 122 may use link 126, which is a communication pathway, to connect with interface 134 in computer 130. Similarly, interface 124 connects with interface 136 of computer 132 over link 128.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
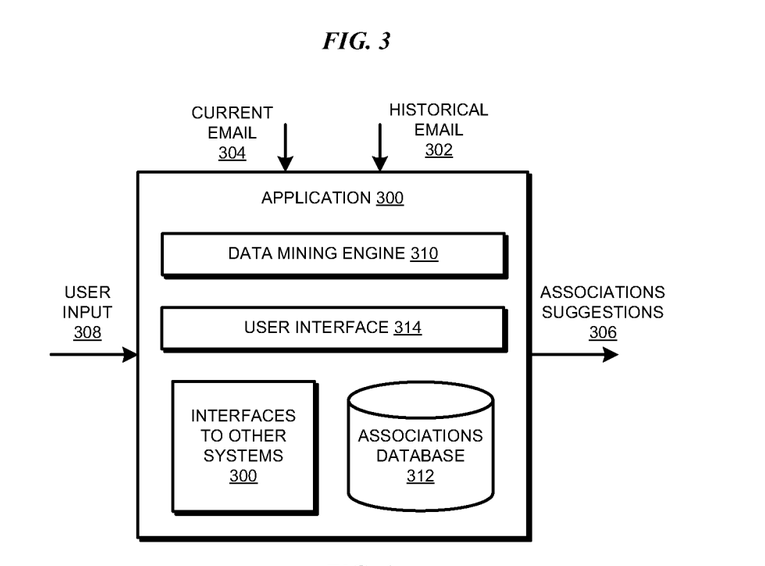
FIG. 3, this figure depicts a block diagram of an email application for dynamically grouping email recipients in accordance with an illustrative embodiment.

With reference to FIG. 3, this figure depicts a block diagram of an email application for dynamically grouping email recipients in accordance with an illustrative embodiment. Application 300 may be implemented as application 111 in FIG. 1.

Application 300 may accept historical email 302 as an input for performing application 300's functions as described below. Application 300 may also include current email 304 that the user may be composing as an input in conjunction with or in substitution for historical email 302. Application 300 may produce associations suggestions 306. A user may use associations suggestions 306 to include additional recipients in an email, such as current email 304. User input 308 may manipulate a function of application 300.

Application 300 includes data mining engine 310. Data mining engine 310 mines, assimilates, analyzes, parses, correlates, or otherwise computes data to discover association of various recipients with one another. Data mining engine 310 uses the data associated with historical email 302, current email 304, user input 308 or a combination thereof, to identify the associations amongst recipients that may be present in one or more of those inputs.

Data mining engine 310 may associate a recipient with another recipient by executing a set of logic or rules. The rules may define how data mining engine 310 may analyze the data of the various inputs. As an example, a rule may specify that if the user composes an email for recipient R1, the data mining engine should identify occurrences of recipient R1 in one or more historical email 302 where other recipients are present. Assume that data mining engine 310 discovers that the user has sent emails to R1 on many occasions where the same email also went to recipient R2. Thus, data mining engine 310 may discover an association of recipient R1 with recipient R2.

Continuing with this example, data mining engine 310 may also discover using the same rule that on some occasions, the user has also included recipient R3 with recipient R1. Data mining engine 310 might discover that in some of those occurrences recipient R2 is also present. Thus, data mining engine 310 may identify associations between recipients R1 and R2; R1 and R3; and R1, R2, and R3.

Furthermore, the same rule, or an additional rule may instruct data mining engine to assign an indicator of strength to the associations. Strength of an association is a representation of the likelihood that when the user is sending an email to one recipient in an association, the user will want to send an email to the associated recipient. As an example, the more often the user has sent emails to R1 and R2 together the stronger their association will be. In the above example, data mining engine 310 may assign an indication of greater strength, such as 8 on a scale of 1 to 10, to the association of R1 and R2, and a an indication of lower strength, such as 3 on the same scale, to the association of R1, R2, and R3. The strength of association of R1 and R3 may be somewhere between 3 and 8, for example, 6.

As another example, another rule may direct data mining engine 310 to identify associations among recipients on the basis of certain content of the various inputs. For example, data mining engine 310 might discover that a certain phrase occurs in the subject line every time the user sends an email to R1 and R2. Data mining engine 310 may associate the phrase with the association of R1 and R2.

When the user begins composing a new email to R1, application 300 may wait to observe whether the user enters the particular phrase in the subject line. If the user enters the phrase, application 300 suggests the association between R1 and R2, prompting the user to include R2 in the email as well. On the contrary, if the user enters a different phrase in the subject line of the email to R1, application 300 may not suggest the association between R1 and R2.

Furthermore, data mining engine 310 may discover relationships or associations between individual recipients, preformed groups of recipients, or a combination thereof. For example, in a manner similar to the above examples, data mining engine 310 may discover an association between recipient R1 and a group of recipients G1, whenever the user sends an email to R1 with the word "report" in the subject line or a spreadsheet included in an attachment.

The examples of specific rules, associations, phrases, and content types in the above illustrative examples are used only for the clarity of the description. Such examples are not limiting on the illustrative embodiments. An implementation may configure a rule with any parameter suitable for discovering associations amongst recipients and groups in a particular data processing environment without departing from the scope of the illustrative embodiments.

Returning to FIG. 3, application 300 includes associations database 312. Data mining engine 310 may record the discovered associations in associations database 312 so that the associations are available to the user for future use. Associations database 312 may be implemented as a flat file, an index file, a relational database, an object oriented database, or any form of data storage system suitable for storing data.

User interface 314 may allow a user to manipulate the functions of application 300. For example, the user may be able to modify an already discovered association, insert new associations without discovery of the associations, manipulate the rules for data mining, or any other function of application 300.

Interfaces 316 to other systems may include mechanisms for integrating application 300 with existing email applications. For example, a user may integrate application 300 with an existing email client application on the user's computer to use the functions of the illustrative embodiments. Interfaces 316 may enable this and other types of inter-application communications so as to allow the illustrative embodiments to interoperate with other applications and data processing systems.

Figure 4:
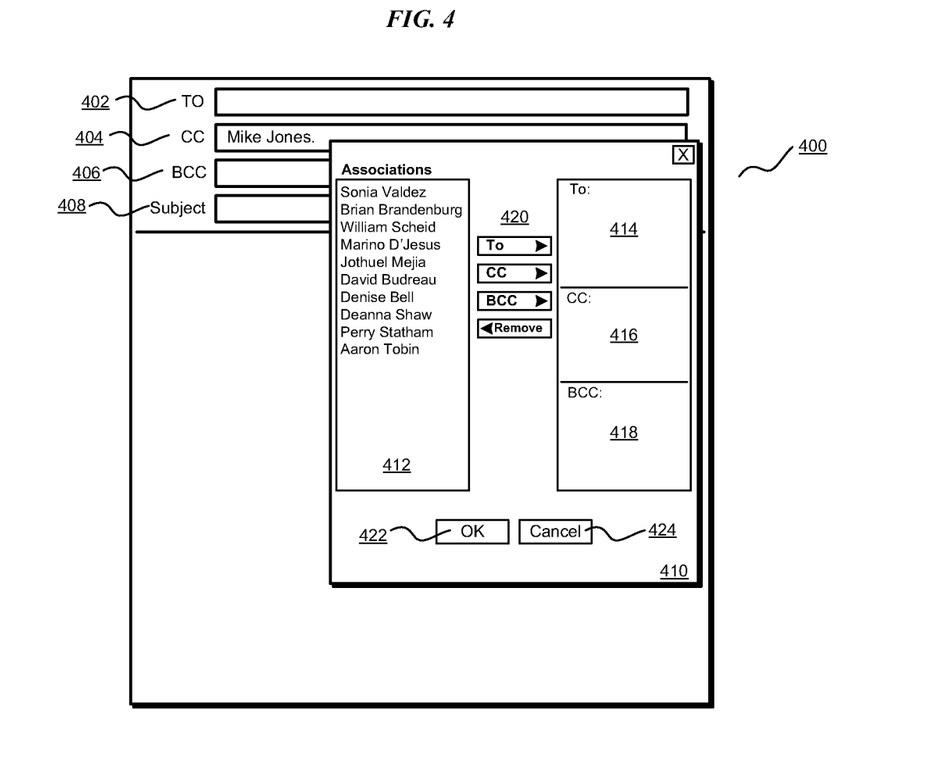
FIG. 4, this figure depicts an example email user interface layout using associations suggestions in accordance with an illustrative embodiment.

With reference to FIG. 4, this figure depicts an example email user interface layout using associations suggestions in accordance with an illustrative embodiment. This figure depicts the user interface to be graphical in nature, but an implementation may use the illustrative embodiments in conjunction with text based user interfaces as well without departing from the scope of the illustrative embodiments. Graphical user interface 400 may be implemented using a software application, such as application 111 in FIG. 1.

Graphical user interface 400 depicts a commonly used familiar email graphical user interface. Data entry fields 402, 404, and 406 represent the "TO", "CC", and "BCC" input fields respectively. A user may input the names or identifiers associated with one or more recipients to whom the user desired to send the email of graphical user interface 400. Data entry field 408 represents the input field commonly used in email graphical user interfaces for entering a "Subject" of the email.

In the example illustrated in this figure, the user is shown to have entered a recipient's name in field 404, "Mike Jones". In accordance with the illustrative embodiment, graphical user interface 400 includes display 410. Display 410 may appear on graphical user interface 400 in any manner suitable for a particular implementation. For example, display 410 may appear as a graphical pop-up screen, an overlay display on graphical user interface 400, a separate graphical window, a textual display over or alongside graphical user interface 400.

Display 410 includes list 412 that may include a suggested listing of other recipients who may have associations with recipient "Mike Jones" of field 404. An entry in list 412 corresponds to a recipient with whom the already identified recipient "Mike Jones".

Recall that the a data mining engine, such as data mining engine 310 in FIG. 3 may have already identified such associations and recorded them in associations database 312 in FIG. 3. In another embodiment, the data mining engine responsible for identifying the associations may execute dynamically, to wit, upon the user entering the value "Mike Jones" in field 404. In such an embodiment, list 412 may contain entries identified on-the-fly, or dynamically, as the user identifies a first recipient.

The presentation of list 412 is also dynamic in nature. For example, list 412 may be displayed only after some user action is complete. In one embodiment, list 412 is displayed when the user has entered information in any of fields 402, 404, or 406. In another embodiment, list 412 may be displayed when the user has additionally entered some information in field 408 as well.

List 412 of other possible recipients may be created and presented dynamically in this manner to the user. Having list 412 available, the user may manipulate entries from list 412 to include those entries in data entry fields 414, 416, and 418 as needed. Fields 414, 416, and 418 correspond to "TO", "CC", and "BCC" input fields. Entries that the user adds to fields 414, 416, and 418 transfer to fields 402, 404, and 406 respectively when the user is satisfied with the selections and exits display 410.

The user may manipulate, migrate, add, or remove entries between list 412 and fields 414, 416, and 418 using tools 420. Tools 420 may be graphical buttons in one embodiment, as shown in this figure. In another embodiment, similar functionality may be achieved by having check-boxes next to the entries of list 412 instead of tools 420. In another embodiment, similar functionality may be achieved through textual commands in place of tools 420.

Once the user is satisfied with the selections from list 412 into fields 414, 416, and 418, the user may use tool 422 to transfer the entries to 402, 404, and 406 respectively, and return to graphical user interface 400. The user may also have available tool 424 to return to graphical user interface 400 without making any selections from list 412. Many other implementation variations of graphical user interface 400 and the various components thereof will be apparent from this disclosure and are contemplated within the scope of the illustrative embodiments.

Figure 5:
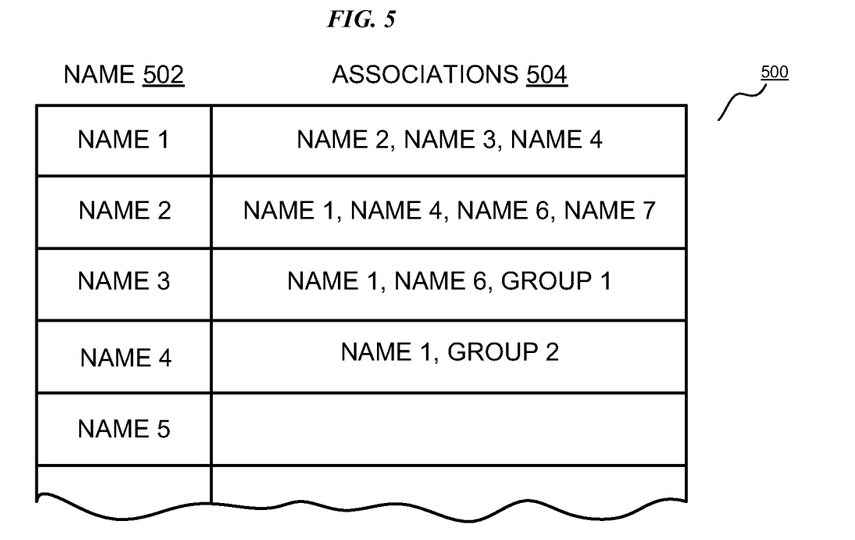
FIG. 5, this figure depicts a table of associations as an example of storing the associations in accordance with an illustrative embodiment.

With reference to FIG. 5, this figure depicts a table of associations as an example of storing the associations in accordance with an illustrative embodiment. Table 500 may be implemented in associations database 312 in FIG. 3.

As an example, an association may be stored or recorded as a list of recipients and groups that may be associated with a recipient. This figure depicts identifiers of recipients in column 502. Some examples of an identifier (ID) that may be recorded in column 502 are a name, a user ID, an email ID, an alphanumeric or symbolic code corresponding to a recipient or group. Column 504 contains recipients or groups associated with the recipient or group identified in column 502 of the same row.

Thus, each row of table 500 represents an association. A recipient or group may appear in column 502 of unlimited number of rows. In other words, a particular recipient or group may have any number of associations with other recipients, groups, or a combination thereof.

Furthermore, a particular embodiment may order the associations, such as by ordering the rows, in some logical order. For example, consider the example described above where recipient R1's association with recipient R2 has strength 8 and association with R2 and R3 has strength 3 on some scale. Associations of higher strength may occupy rows near the top of table 500 as compared to lower strength associations. Ordering the associations in some manner may be beneficial in composing the list of associations to display to the user, such as in list 412 in FIG. 4. Recipients with strong associations with the already specified recipient may appear near the top of list 412 in FIG. 4 so that the user may not have to scroll to the bottom of the list. Of course, the associations may be ordered in other ways and by using other criteria, such as a recipient's position in an organization.

An implementation may use any ordering logic or criteria without departing from the scope of the illustrative embodiments. Furthermore, an implementation may utilize the ordering to derive other benefits or features without departing from the scope of the illustrative embodiments.

Figure 6:
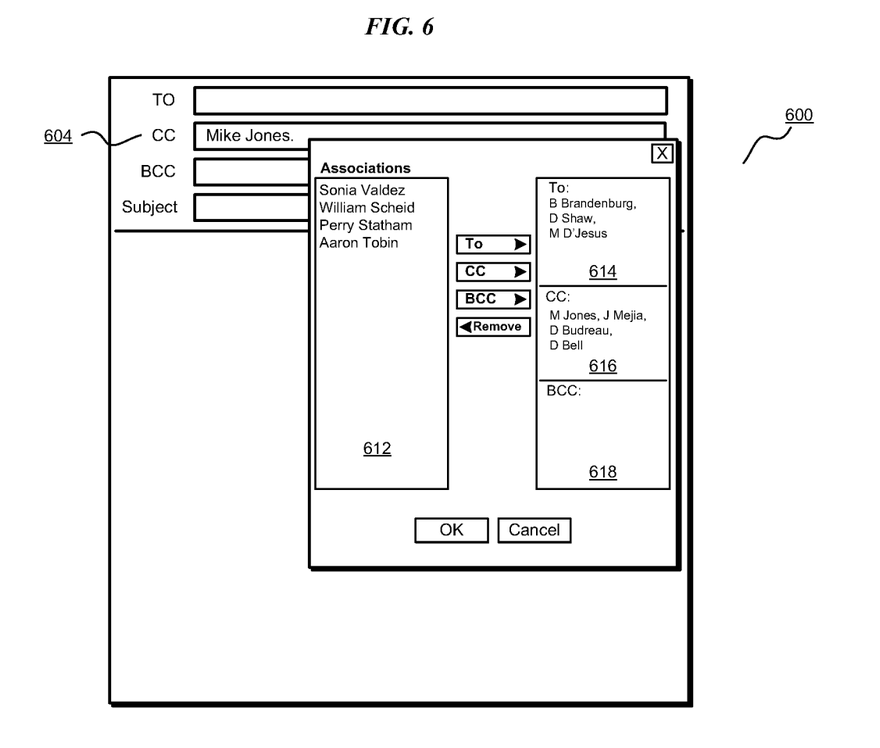
FIG. 6, this figure depicts an example email user interface layout showing a selection of associations in accordance with an illustrative embodiment.

With reference to FIG. 6, this figure depicts an example email user interface layout showing a selection of associations in accordance with an illustrative embodiment. Graphical user interface 600 may be analogous to graphical user interface 400 in FIG. 4. The components of graphical user interface 600 may be analogous to the corresponding components as illustrated in FIG. 4.

List 612 is composed using associations of recipient "Mike Jones" identified in field 604. Recall that such associations may be retried from example table 500 in FIG. 5. List 612 is displayed to the user in a manner similar to list 412 in FIG. 4.

This figure shows as an example that the user has selected and moved some entries of recipients associated with "Mike Jones" to fields 614 and 616. The entries that the user has moved to fields 614 and 616 have been removed from list 412. An implementation may not remove the entries from list 412 within the scope of the illustrative embodiments. Furthermore, an implementation may also include entries from other areas of graphical user interface 600 into fields 614, 616, and 618. For example, field 616 shows an entry "M Jones" that was not on list 412 in FIG. 4, but has been incorporated into field 616 from the data "Mike Jones" of field 604. Many other variations of manipulating entries will be conceivable from this disclosure and the same are contemplated within the scope of the illustrative embodiments.

Figure 7:
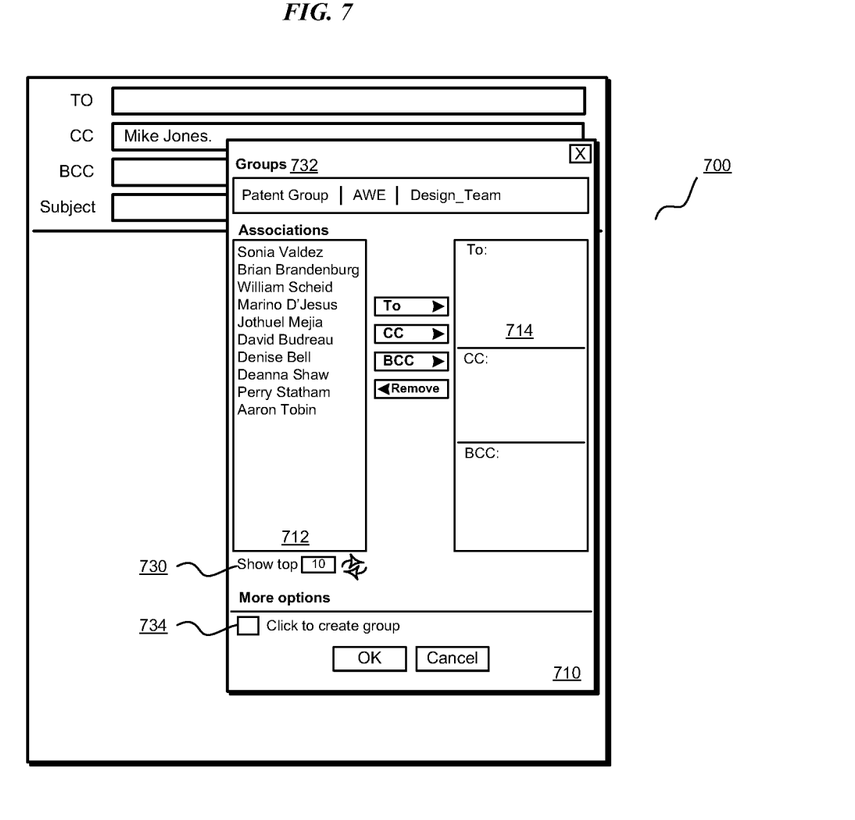
FIG. 7, this figure depicts another example email user interface layout using associations in accordance with an illustrative embodiment.

With reference to FIG. 7, this figure depicts another example email user interface layout using associations in accordance with an illustrative embodiment. Graphical user interface 700 may be analogous to graphical user interface 400 in FIG. 4 or graphical user interface 600 in FIG. 6. Some components of graphical user interface 700 may be analogous to the corresponding components as illustrated in FIG. 6. For example, display 710 is similar to display 610 but includes additional components. List 712 is analogous to list 612 in FIG. 6.

Additional components may provide additional functionality in graphical user interface 700 within the scope of the illustrative embodiments. As an example, display 710 includes feature 730 that may allow the user to filter or limit the number of entries displayed in list 712. In the depicted example, feature 730 allows a user to limit list 712 to a certain number of entries, the user being able to configure the number using feature 730.

As another example feature, display 710 includes list 732, which may be a list of preexisting groups of recipients. In this manner, the user may be able to discern visually the individual recipients and preformed groups separately in lists 712 and 732 respectively.

As another example feature, display 710 may include feature 734 that may allow the user to create a new group for future use from the entries of list 712. For example, the user may be able to move some entries from list 712 to field 714, and indicate using feature 734 that a group should be created using those entries. These and other similar features may enhance the user's convenience in selecting the associated recipients and groups. Many other features are conceivable that may utilize the illustrative embodiments in improving the user's experience and convenience for the current email as well as for the user's future use. Such other features can be implementation specific and are contemplated within the scope of the illustrative embodiments.

Figure 8A:
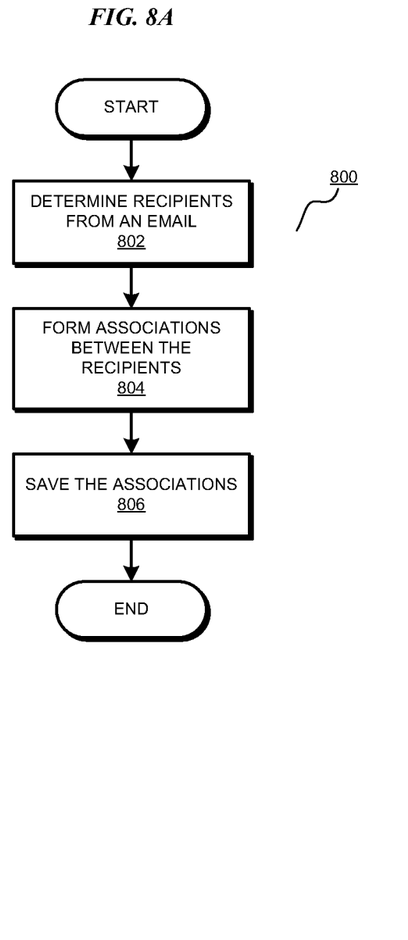
FIG. 8A, this figure depicts a flowchart of a process of discovering associations between recipients in accordance with an illustrative embodiment.

With reference to FIG. 8A, this figure depicts a flowchart of a process of discovering associations between recipients in accordance with an illustrative embodiment. Process 800 may be implemented in data mining engine 310 in FIG. 3.

Process 800 begins by determining the recipients of an email (step 802). The email of step 802 may be a historical email as described with respect to FIG. 3.

Process 800 forms associations between those recipients (step 804). For example, process 800 may identify two recipients R1 and R2 in step 802. In one embodiment, process 800 may form an association R1-R2, form another association R2-R1, and store the associations as separate association records. In another embodiment, process 800 may use a computation or reference, such as keys in a database, to associate R1 with R2. These example ways of implementing step 804 are not limiting on the illustrative embodiments. Step 804 may be implemented in numerous ways according to specific data processing environments within the scope of the illustrative embodiments.

Process 800 saves the associations formed in step 804 (step 806). Process 800 ends thereafter. As an example, process 800 may perform step 806 using associations database 312 in FIG. 3.

Figure 8B:
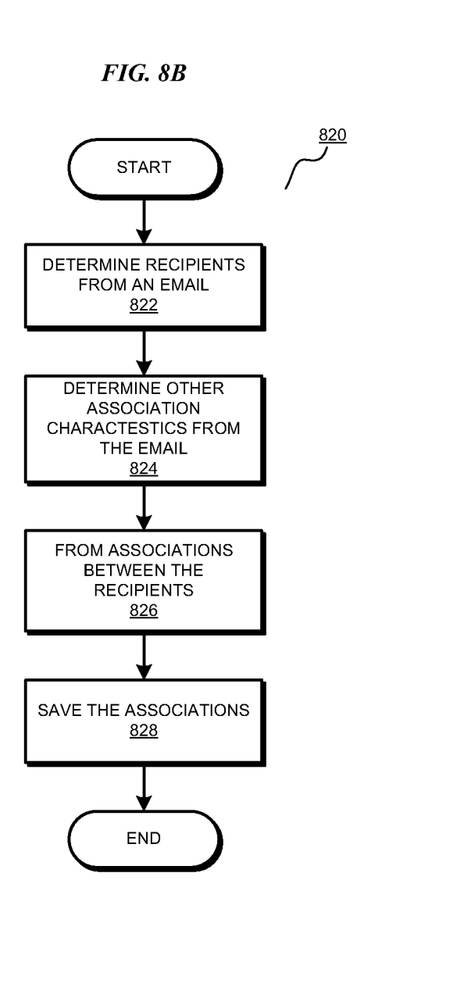
FIG. 8B, this figure depicts a flowchart of another process of discovering associations between recipients in accordance with an illustrative embodiment.

With reference to FIG. 8B, this figure depicts a flowchart of another process of discovering associations between recipients in accordance with an illustrative embodiment. Process 820 may be implemented in data mining engine 310 in FIG. 3.

Process 820 begins by determining the recipients of an email (step 822). The email of step 822 may be a historical email as described with respect to FIG. 3.

Process 820 determines other association characteristics from the email (step 824). For example, process 800 may also identify phrases, notations, content type, attachment types, attachment names, or other characteristics of the contents of the email of step 822 in step 824.

As another example, process 800 may identify a time of sending of the email as a characteristic of the email of step 822. In other words, the user may send an email to recipients R1 and R2 together only on the first of every month, such as when sending a periodic report. Process 800 may identify such periodicity of the email as a characteristic of the email of step 822.

Process 820 forms associations between the recipients identified in step 822 (step 826). For example, process 820 may identify two recipients R1 and R2 in step 822. Process 820 may also identify a particular keyword in the subject line of the email. In one embodiment, process 800 may form associations R1-R2 and R2-R1 on the basis of the keyword. Process 820 may store the associations as separate association records. In another embodiment, process 820 may use a computation or reference, such as keys in a database, to associate R1, R2, and the keyword. These example ways of implementing step 826 are not limiting on the illustrative embodiments. Step 826 may be implemented in numerous ways according to specific data processing environments within the scope of the illustrative embodiments.

Process 820 saves the associations formed in step 826 (step 828). Process 820 ends thereafter. As an example, process 820 may perform step 828 using associations database 312 in FIG. 3.

Figure 9:
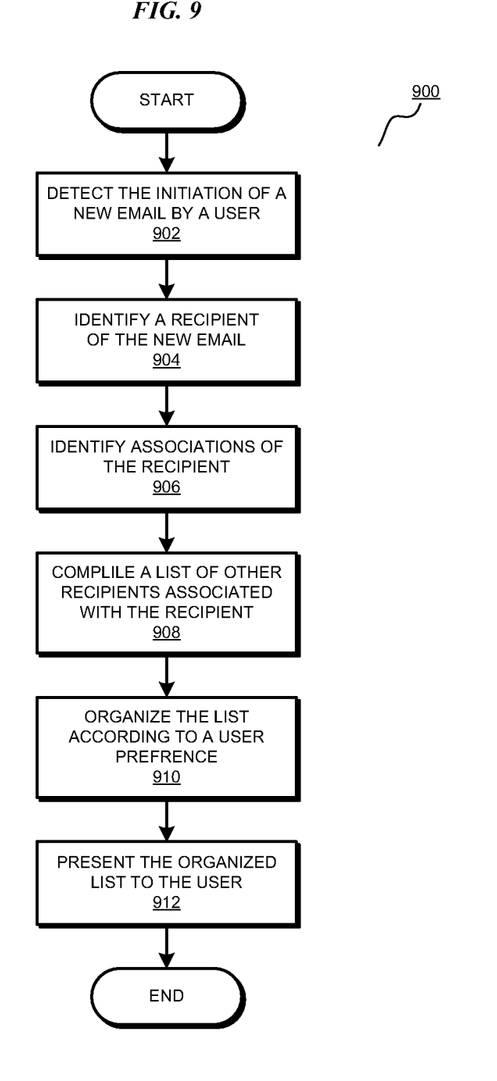
FIG. 9, this figure depicts a flowchart of a process of suggesting associations in accordance with an illustrative embodiment.

With reference to FIG. 9, this figure depicts a flowchart of a process of suggesting associations in accordance with an illustrative embodiment. Process 900 may be implemented using an email application such as application 300 in FIG. 3.

Process 900 begins by detecting the initiation of a new email by a user (step 902). Process 900 identifies a recipient of the new email (step 904). Process 900 may additionally identify other characteristics of the email contents in step 904 in the manner described above.

Process 900 identifies associations of the recipient of step 904 (step 906). For example, process 900 may retrieve the associations of the identified recipients from an associations database.

Process 90 compiles a list of other recipients associated with the recipient of step 904 (step 908). Process 900 may optionally, organize the list according to some user preference (step 910). For example, the user may desire to see only the top 10 associations of the recipient. As another example, the user may prefer to see only the associations whose strength is 8 or higher on an example scale of 1 to 10.

Process 900 presents the organized list of associated recipients to the user (step 912). Process 900 ends thereafter.

Figure 10:
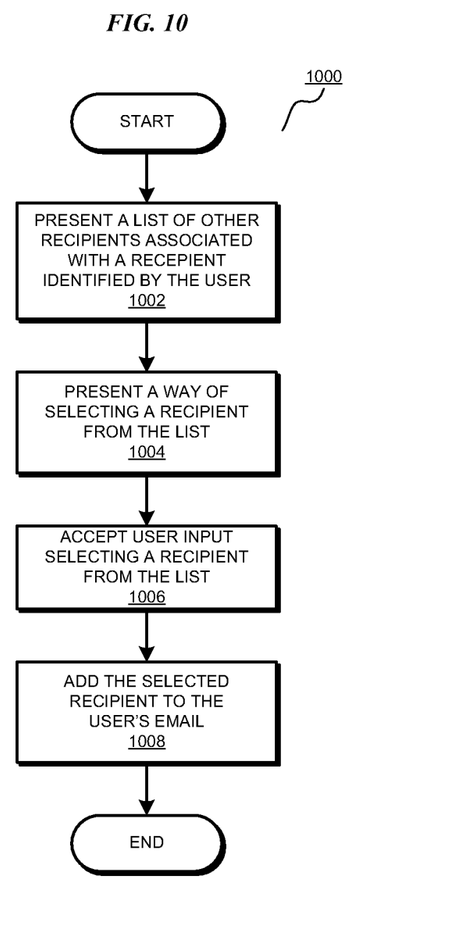
FIG. 10, this figure depicts a flowchart of a process of selecting associated recipients in accordance with an illustrative embodiment.

With reference to FIG. 10, this figure depicts a flowchart of a process of selecting associated recipients in accordance with an illustrative embodiment. Process 1000 may be implemented in an email user interface, such as graphical user interface 600 in FIG. 6 or graphical user interface 700 in FIG. 7.

Process 1000 begins by presenting a list of other recipients and groups associated with the recipient identified by the user (step 1002). The list may be compiled and presented using process 900 in FIG. 9.

Process 1000 presents a way for the user to select a recipient from the list (step 1004). As depicted in the example graphical user interface 600 of FIG. 6, the user may move the desired recipients from the list to other data entry fields using tools available on the graphical user interface. For example, process 1000 may present buttons, checkboxes, text input fields, or other methods for performing step 1004.

Process 1000 accepts a user input selecting a recipient from the list (step 1006). Process 1000 adds the selected recipient to the user's email (step 1008). Process 1000 terminates thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for dynamically grouping email recipients. Using the illustrative embodiments, an application may be able to analyze a set of email messages and discover interrelationships or associations amongst the various recipients of those email messages. Based on the discovered associations, the illustrative embodiments can present a list of possible additional recipients to whom the user may want to send the email as well when the user identifies on recipient.

The illustrative embodiments may save the discovered associations and continually modify and refine the associations based on additional emails the user sends or receives over time. For example, the illustrative embodiments may increase the strength of an association if the illustrative embodiments observe additional occurrences of the associated recipients in the user's ongoing emails.

The illustrative embodiments may also allow the user to modify the associations, such as when a recipient's name changes, a membership of a group changes, or a recipient leaves the user's organization. The illustrative embodiments may also present to the user a variety of tools and functions for facilitating the management of the recipients and the associations. For example, the illustrative embodiments may allow the user to sort the list of associated recipients in alphabetical order or decreasing order of strength. As another example, the illustrative embodiments may allow the user to block certain recipients from appearing on the suggested list, even if the recipient is associated with a recipient that the user has identified. As another example, the illustrative embodiments may allow the user to form ad-hoc groups of recipients from a list of associated recipients.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for dynamically grouping email recipients, the computer implemented method comprising:
   identifying a first recipient and a second recipient included in a first email, the first email being a new email being composed for sending to the first and the second recipients;
   identifying a characteristic of the first email, wherein the characteristic is derived from a content in a body section of the first email;
   forming an association between the first recipient and the second recipient using the characteristic, wherein forming the association uses the characteristic as a basis for future use of the association;
   detecting a selection of the first recipient in a second email, wherein the second email is an email being composed after the first email is composed; and
   suggesting, using the association and a presence of the characteristic in the second email, the second recipient as a recipient of the second email.

2. The computer implemented method of claim 1, wherein the characteristic is one of (i) a phrase in, (ii) a type of content in, and (iii) an attachment in the first email.

3. The computer implemented method of claim 1, further comprising:
   assigning an indicator of a strength of the association to the association, wherein the strength of the association corresponds to the likelihood that the second recipient should receive an email being sent to the first recipient.

4. The computer implemented method of claim 1, further comprising:
   storing the association;
   detecting a third email, wherein the third email is directed to the first recipient and the second recipient; and
   modifying the strength of the association based on the third email.

5. The computer implemented method of claim 1, wherein suggesting includes suggesting a list of a plurality of associated recipients, the computer implemented method further comprising:
   displaying the list;
   accepting a first input indicating a selection of a third recipient from the list; and
   including the third recipient as a recipient of the second email.

6. The computer implemented method of claim 5, wherein the list further includes a set of preformed groups of recipients, and wherein the selection of the third recipient is a selection of a preformed group from the set of preformed groups.

7. The computer implemented method of claim 5, further comprising:
   accepting a second input to arrange the list according to a user preference;
   accepting a third input to form a group, the group comprising a combination of (i) a second plurality of associated recipients from the plurality of associated recipients and (ii) a subset of a set of preformed groups included in the list; and forming the group.

8. The computer implemented method of claim 1, wherein the characteristic is a time of sending of the first email.

9. The computer implemented method of claim 1, wherein the characteristic is a periodicity of the first email.

10. A computer usable program product comprising a computer usable non-transitory medium including computer usable code for dynamically grouping email recipients, the computer usable code comprising:

computer usable code for identifying a first recipient and a second recipient included in a first email, the first email being a new email being composed for sending to the first and the second recipients;

computer usable code for identifying a characteristic of the first email, wherein the characteristic is derived from a content in a body section of the first email;

computer usable code for forming an association between the first recipient and the second recipient using the characteristic, wherein forming the association uses the characteristic as a basis for future use of the association;

computer usable code for detecting a selection of the first recipient in a second email, wherein the second email is an email being composed after the first email is composed; and computer usable code for suggesting, using the association and a presence of the characteristic in the second email, the second recipient as a recipient of the second email.

11. The computer usable program product of claim 10, wherein the characteristic is one of (i) a phrase in, (ii) a type of content in, and (iii) an attachment in the first email.

12. The computer usable program product of claim 10, further comprising:

computer usable code for assigning an indicator of a strength of the association to the association, wherein the strength of the association corresponds to the likelihood that the second recipient should receive an email being sent to the first recipient.

13. The computer usable program product of claim 10, further comprising:

computer usable code for storing the association;

computer usable code for detecting a third email, wherein the third email is directed to the first recipient and the second recipient; and computer usable code for modifying the strength of the association based on the third email.

14. The computer usable program product of claim 10, wherein the computer usable code for suggesting includes computer usable code for suggesting a list of a plurality of associated recipients, the computer usable program product further comprising:

computer usable code for displaying the list;

computer usable code for accepting a first input indicating a selection of a third recipient from the list; and computer usable code for including the third recipient as a recipient of the second email.

15. The computer usable program product of claim 14, wherein the list further includes a set of preformed groups of recipients, the computer usable program product further comprising:

computer usable code for accepting a second input to arrange the list according to a user preference;

computer usable code for accepting a third input to form a group, the group comprising a combination of (i) a second plurality of associated recipients from the plurality of associated recipients and (ii) a subset of the preformed groups; and computer usable code for forming the group.

16. The computer program product of claim 10, wherein the computer usable code is stored in a computer readable storage medium in a data processing system, and wherein the computer usable code is transferred over a network from a remote data processing system.

17. The computer program product of claim 10, wherein the computer usable code is stored in a computer readable storage medium in a server data processing system, and wherein the computer usable code is downloaded over a network to a remote data processing system for use in a computer readable storage medium associated with the remote data processing system.

18. A data processing system for dynamically grouping email recipients, the data processing system comprising:

a storage device including a storage medium, wherein the storage device stores computer usable program code; and a processor, wherein the processor executes the computer usable program code, and wherein the computer usable program code comprises:

computer usable code for identifying a first recipient and a second recipient included in a first email, the first email being a new email being composed for sending to the first and the second recipients;

computer usable code for identifying a characteristic of the first email, wherein the characteristic is derived from a content in a body section of the first email;

computer usable code for forming an association between the first recipient and the second recipient using the characteristic, wherein forming the association uses the characteristic as a basis for future use of the association;

computer usable code for detecting a selection of the first recipient in a second email, wherein the second email is an email being composed after the first email is composed; and computer usable code for suggesting, using the association and a presence of the characteristic in the second email, the second recipient as a recipient of the second email.

19. The data processing system of claim 18, further comprising:

computer usable code for assigning an indicator of a strength of the association to the association, wherein the strength of the association corresponds to the likelihood that the second recipient should receive an email being sent to the first recipient;

computer usable code for storing the association;

computer usable code for detecting a third email, wherein the third email is directed to the first recipient and the second recipient; and computer usable code for modifying the strength of the association based on the third email.

20. The data processing system of claim 18, wherein the computer usable code for suggesting includes computer usable code for suggesting a list of a plurality of associated recipients, the list further including a set of preformed groups of recipients, the data processing system further comprising:

computer usable code for displaying the list;

computer usable code for accepting a first input indicating a selection of a third recipient from the list;

computer usable code for including the third recipient as a recipient of the second email;

computer usable code for accepting a second input to arrange the list according to a user preference;

computer usable code for accepting a third input to form a group, the group comprising a combination of (i) a second plurality of associated recipients from the plurality of associated recipients and (ii) a subset of the preformed groups; and computer usable code for forming the group.

21. A system for dynamically grouping email recipients, the system comprising:

means for identifying a first recipient and a second recipient included in a first email, the first email being a new email being composed for sending to the first and the second recipients;

means for identifying a characteristic of the first email, wherein the characteristic is derived from a content in a body section of the first email;

means for forming an association between the first recipient and the second recipient using the characteristic, wherein forming the association uses the characteristic as a basis for future use of the association;

means for detecting a selection of the first recipient in a second email, wherein the second email is an email being composed after the first email is composed; and means for suggesting, using the association and a presence of the characteristic in the second email, the second recipient as a recipient of the second email.

\* \* \* \* \*